(No Model.)

J. E. HALE.

COMBINED CANE, FLASK, AND DRINKING CUP.

No. 395,224. Patented Dec. 25, 1888.

Witnesses
Lillie Hanna
John F. Nelson

Inventor.
James Ellis Hale
By Knight Bros
Attorneys

UNITED STATES PATENT OFFICE.

JAMES E. HALE, OF PLAINFIELD, NEW JERSEY, ASSIGNOR OF ONE-HALF TO THOMAS KEDDIE, OF BROOKLYN, NEW YORK.

COMBINED CANE, FLASK, AND DRINKING-CUP.

SPECIFICATION forming part of Letters Patent No. 395,224, dated December 25, 1888.

Application filed July 23, 1888. Serial No. 280,769. (No model.)

*To all whom it may concern:*

Be it known that I, JAMES ELLIS HALE, a citizen of the United States, residing at Plainfield, county of Union, and State of New Jersey, have invented a new and Improved Combined Cane, Flask, and Drinking-Cup, of which the following is a specification.

My present invention consists in making a hollow cane preferably with a suitable lining on the inside, so that it will form a receptacle or flask for liquids, and in combining therewith a collapsible drinking-cup, which is made removable, and which, when in place, forms the knob, head, or handle of the cane, and which, when separated, uncovers the flask, as will be hereinafter described.

Figure 1:
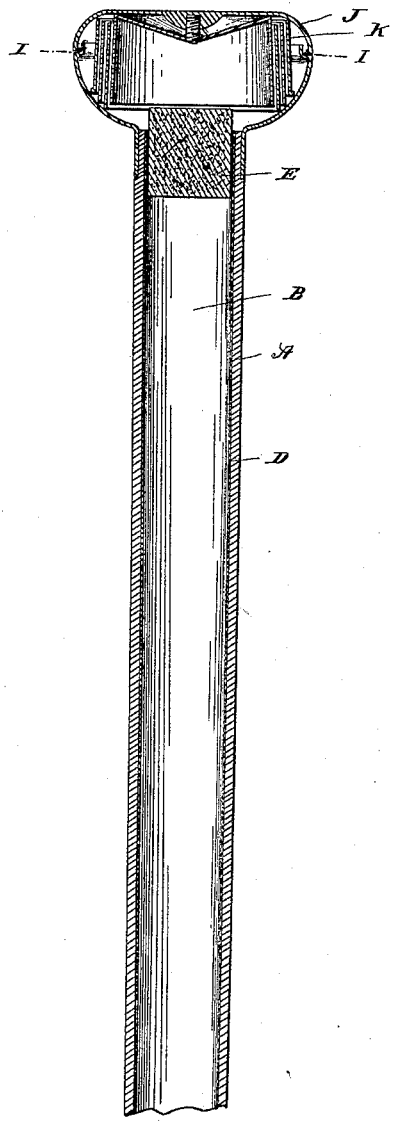
Figure 3:
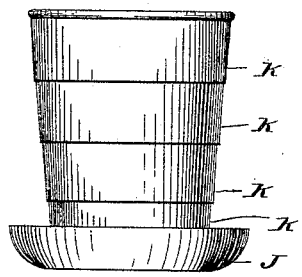
Figure 2:
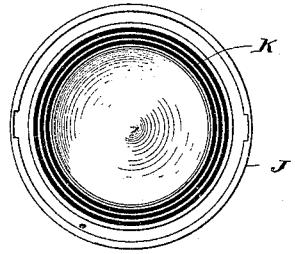
Figure 2:
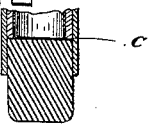

Referring to the accompanying drawings, which form a part of this specification, Figure 1 is a vertical section. Fig. 2 is an under side plan view of the collapsible cup removed. Fig. 3 is a side elevation of the drinking-cup distended and ready for use.

In the drawings, A is a cane formed of any suitable material, provided with a hollow space, B, as shown, closed at its lower end, C, and having a lining, D, on the inside to prevent the liquid from leaking out, and having its flavor affected by the material of the cane. This lining may be made of glass, metal, or any other suitable material. The upper end has a cork or stopper, E, inserted into it or screwed thereon, as may be preferred. The handle of the cane is a hollow oblate spheroid split transversely at the equatorial line I, the upper part, J, either screwing or snapping like a watch-case lid over the lower part, and being removable and provided with sections or rings K, which constitute, in connection with the upper part of the handle, a collapsible drinking-cup composed of a series of nested or telescope rings.

Fig. 1 shows all the parts in their normal position. Fig. 2 shows the upper part of the knob or handle just removed, and Fig. 3 shows the collapsible cup drawn into position and ready for use as a drinking-receptacle.

When it is desired to remove some of the contents of the flask within the cane, the upper part of the handle is removed and the cup formed, as above described. The cork or stopper E may be withdrawn and a portion of the liquid within the flask may be poured into the cup. In some cases the cane-flask may be made without the collapsible cup attached.

The above construction forms a convenient arrangement for carrying liquids, and its portability affords great convenience to travelers.

Having thus described my invention, the following is what I claim as new therein and desire to secure by Letters Patent:

1. A hollow cane formed for the purpose of a flask and provided with a stopper, as shown, in combination with a handle in the form of a hollow oblate spheroid, the upper portion of which is removable for obtaining access to the flask.

2. A hollow cane constructed substantially as shown and described, and for the purpose set forth, the upper portion of which is removable, the said cane being provided with an interior lining of glass or other suitable material, and having a removable stopper protected by said upper portion.

3. The combination, with the cane provided with the flask for containing liquid, of a removable upper portion having telescoped or nested rings, as shown, which constitutes a collapsible cup.

JAS. E. HALE.

Witnesses:
 JESUS MANNING,
 HERBERT KNIGHT.